United States Patent
Kim et al.

(10) Patent No.: US 10,333,637 B2
(45) Date of Patent: Jun. 25, 2019

(54) METHOD FOR STABLY OPERATING FDR MODE IN WIRELESS COMMUNICATION SYSTEM SUPPORTING FDR MODE, AND DEVICE FOR SAME

(71) Applicant: LG ELECTRONICS INC., Seoul (KR)

(72) Inventors: Dongkyu Kim, Seoul (KR); Hyunsoo Ko, Seoul (KR); Kwangseok Noh, Seoul (KR); Sangrim Lee, Seoul (KR); Hojae Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/566,683

(22) PCT Filed: Nov. 12, 2015

(86) PCT No.: PCT/KR2015/012150
§ 371 (c)(1),
(2) Date: Oct. 13, 2017

(87) PCT Pub. No.: WO2016/167434
PCT Pub. Date: Oct. 20, 2016

(65) Prior Publication Data
US 2018/0123710 A1    May 3, 2018

Related U.S. Application Data

(60) Provisional application No. 62/148,749, filed on Apr. 17, 2015.

(51) Int. Cl.
*H04B 17/345* (2015.01)
*H04L 1/00* (2006.01)
(Continued)

(52) U.S. Cl.
CPC .......... *H04B 17/345* (2015.01); *H04B 17/10* (2015.01); *H04B 17/21* (2015.01); *H04B 17/24* (2015.01); *H04L 1/00* (2013.01); *H04L 5/14* (2013.01)

(58) Field of Classification Search
None
See application file for complete search history.

(56) References Cited

U.S. PATENT DOCUMENTS 9,713,010 B2 * 7/2017 Khandani ............. H04W 16/14
2009/0213765 A1 8/2009 Rinne et al.
(Continued)

FOREIGN PATENT DOCUMENTS

KR   1020140090351    7/2014
WO      2013173250    11/2013

OTHER PUBLICATIONS

PCT International Application No. PCT/KR2015/012150, Written Opinion of the International Searching Authority dated Feb. 23, 2016, 20 pages.

*Primary Examiner* — Hong S Cho
(74) *Attorney, Agent, or Firm* — Lee, Hong, Degerman, Kang & Waimey

(57) ABSTRACT

A method for stably operating an FDR mode by a terminal in a wireless communication system supporting the full-duplex radio (FDR) mode comprises the steps of: if a residual self-interference signal is changed to a predetermined threshold or higher in a terminal, transmitting information about the changed residual self-interference signal to a base station; and receiving from the base station a downlink signal on the basis of a modulation and coding scheme (MCS) level that corresponds to the information about the changed residual self-interference signal.

15 Claims, 5 Drawing Sheets

(51) Int. Cl.
*H04L 5/14* (2006.01)
*H04B 17/10* (2015.01)
*H04B 17/21* (2015.01)
*H04B 17/24* (2015.01)

(56) References Cited

U.S. PATENT DOCUMENTS

| | | | |
|---|---|---|---|
| 2011/0051796 A1 | 3/2011 | Khayrallah | |
| 2014/0198688 A1* | 7/2014 | Li | H04L 5/1461 370/278 |
| 2015/0229461 A1* | 8/2015 | DiFazio | H04L 5/14 370/280 |
| 2015/0358982 A1* | 12/2015 | Jeon | H04J 11/005 370/252 |
| 2016/0134337 A1* | 5/2016 | Branlund | H04B 7/212 455/446 |

* cited by examiner

METHOD FOR STABLY OPERATING FDR MODE IN WIRELESS COMMUNICATION SYSTEM SUPPORTING FDR MODE, AND DEVICE FOR SAME

CROSS REFERENCE TO RELATED APPLICATIONS

This application is the National Stage filing under 35 U.S.C. 371 of International Application No. PCT/KR2015/012150, filed on Nov. 5, 2015, which claims the benefit of U.S. Provisional Applications No. 62/148,749, filed on Apr. 17, 2015, the contents of which are all hereby incorporated by reference herein in their entirety.

TECHNICAL FIELD

The present invention relates to wireless communication and, more particularly, to a method of stably implementing a full-duplex radio (FDR) mode in a wireless communication system supporting the FDR mode, and a device therefor.

BACKGROUND ART

Full-duplex communication refers to technology for theoretically doubling system capacity as compared to a half-duplex communication for simultaneously performing transmission and reception in one node to orthogonally divide and use time resources or frequency resources.

FIG. 1 is a conceptual view of a UE and a Base Station (BS) which support Full Duplex Radio (FDR).

In the FDR situation illustrated in FIG. 1, the following three types of interference are produced.

Intra-device self-interference: Because transmission and reception take place in the same time and frequency resources, a desired signal and a signal transmitted from a BS or UE are received at the same time at the BS or UE. The transmitted signal is received with almost no attenuation at a Reception (Rx) antenna of the BS or UE, and thus with much larger power than the desired signal. As a result, the transmitted signal serves as interference.

UE to UE inter-link interference: An Uplink (UL) signal transmitted by a UE is received at an adjacent UE and thus serves as interference.

BS to BS inter-link interference: The BS to BS inter-link interference refers to interference caused by signals that are transmitted between BSs or heterogeneous BSs (pico, femto, and relay) in a HetNet state and received by an Rx antenna of another BS.

Among such three types of interference, intra-device self-interference (hereinafter, self-interference (SI)) is generated only in an FDR system to significantly deteriorate performance of the FDR system. Therefore, first of all, intra-device SI needs to be cancelled in order to operate the FDR system.

DISCLOSURE

Technical Problem

An object of the present invention is to provide a method of stably implementing a full-duplex radio (FDR) mode at a user equipment (UE) in a wireless communication system supporting the FDR mode.

Another object of the present invention is to provide a user equipment for stably implementing a full-duplex radio (FDR) mode in a wireless communication system supporting the FDR mode.

Another object of the present invention is to provide a method of stably implementing a full-duplex radio (FDR) mode at a base station in a wireless communication system supporting the FDR mode.

Another object of the present invention is to provide a base station for stably implementing a full-duplex radio (FDR) mode in a wireless communication system supporting the FDR mode.

The technical problems solved by the present invention are not limited to the above technical problems and other technical problems which are not described herein will become apparent to those skilled in the art from the following description.

Technical Solution

The object of the present invention can be achieved by providing a method for operating stably a full-duplex radio (FDR) mode by a user equipment (UE) in a wireless communication system supporting the FDR mode including, when a residual self-interference signal is changed that the residual self-interference signal is equal to or greater than a predetermined threshold in the UE, transmitting information on a changed residual self-interference signal to a base station, and receiving a downlink signal from the base station based on a modulation and coding scheme (MCS) level corresponding to the information on the changed residual self-interference signal. The information on the changed residual self-interference signal may include a value of a strength of the changed residual self-interference signal and the information on the changed residual self-interference signal may include a margin value of the MCS level. The method may further include calculating the margin value of the MCS level based on the value of the strength of the changed residual self-interference signal. The margin value of the MCS level may be a negative value if the strength of the changed residual self-interference signal is increased and may be a positive value if the strength of the changed residual self-interference signal is decreased. The information on the changed residual self-interference signal may be transmitted only when an absolute value of transmit power of the UE is equal to or greater than a predetermined threshold. The method may further include receiving information on the MCS level corresponding to the information on the changed residual self-interference signal from the base station. The margin value of the MCS level may correspond to a difference from a previously used MCS level in a predetermined MCS level table.

In another aspect of the present invention, provided herein is a user equipment (UE) for stably operating a full-duplex radio (FDR) mode in a wireless communication system supporting the FDR mode including a transmitter configured to transmit information on a changed residual self-interference signal to a base station when a residual self-interference signal is changed that the residual self-interference signal is equal to or greater than a predetermined threshold or more in the UE and a receiver configured to receive a downlink signal from the base station based on a modulation and coding scheme (MCS) level corresponding to the information on the changed residual self-interference signal. The information on the changed residual self-interference signal may include a value of a strength of the changed residual self-interference signal, and the information on the changed residual self-interference signal may include a margin value of the MCS level. The UE may further include a processor configured to calculate the margin value of the MCS level based on the value of the strength of the changed residual self-interference signal. The transmitter may transmit the information on the changed residual self-interference signal only when an absolute value of transmit power of the UE is equal to or greater than a predetermined threshold. The receiver may further receive information on the MCS level corresponding to the information on the changed residual self-interference signal from the base station. The margin value of the MCS level may correspond to a difference from a previously used MCS level in a predetermined MCS level table.

Advantageous Effects

According to the embodiment of the present invention, it is possible to stably implement FDR by considering a residual self-interference signal generated by change in self-interference cancellation (IC) performance due to change in transmit power of a user equipment (UE) and a base station in an FDR transmission and reception system.

The effects which can be obtained by the present invention are not limited to the above-described effects and other effects which are not described herein will become apparent to those skilled in the art from the following description.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE

Figure 1:
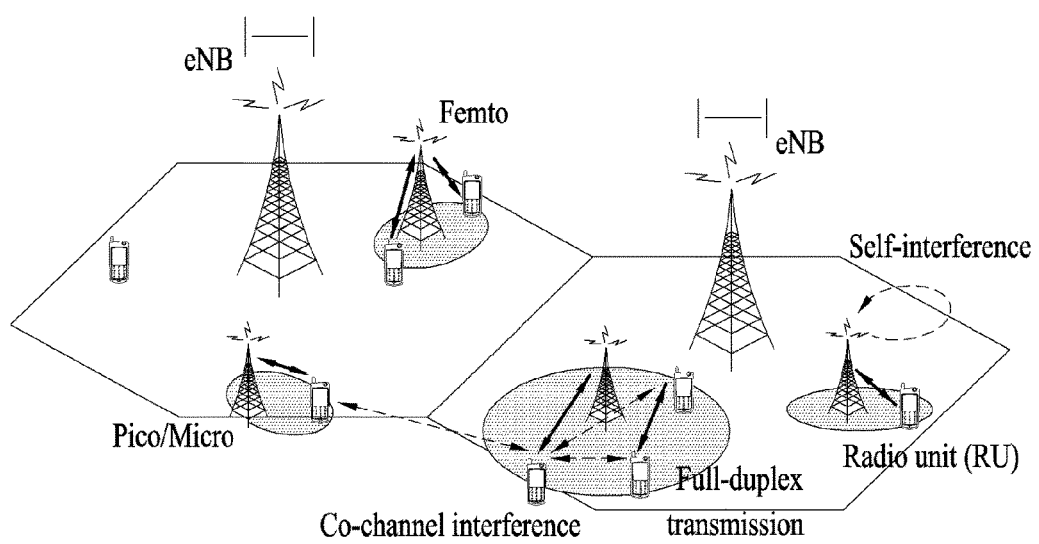
FIG. 1 is a diagram showing a network supporting a full-duplex/half-duplex communication method of a user equipment (UE) proposed in the present invention.

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP) and the like. Although the present specification is described based on IEEE 802.16m system, contents of the present invention may be applicable to various kinds of other communication systems.

In a mobile communication system, a user equipment is able to receive information in downlink and is able to transmit information in uplink as well. Information transmitted or received by the user equipment node may include various kinds of data and control information. In accordance with types and usages of the information transmitted or received by the user equipment, various physical channels may exist.

The following descriptions are usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented by such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE employs OFDMA in DL and SC-FDMA in UL. And, LTE-A (LTE-Advanced) is an evolved version of 3GPP LTE.

Moreover, in the following description, specific terminologies are provided to help the understanding of the present invention. And, the use of the specific terminology can be modified into another form within the scope of the technical idea of the present invention.

Figure 2:
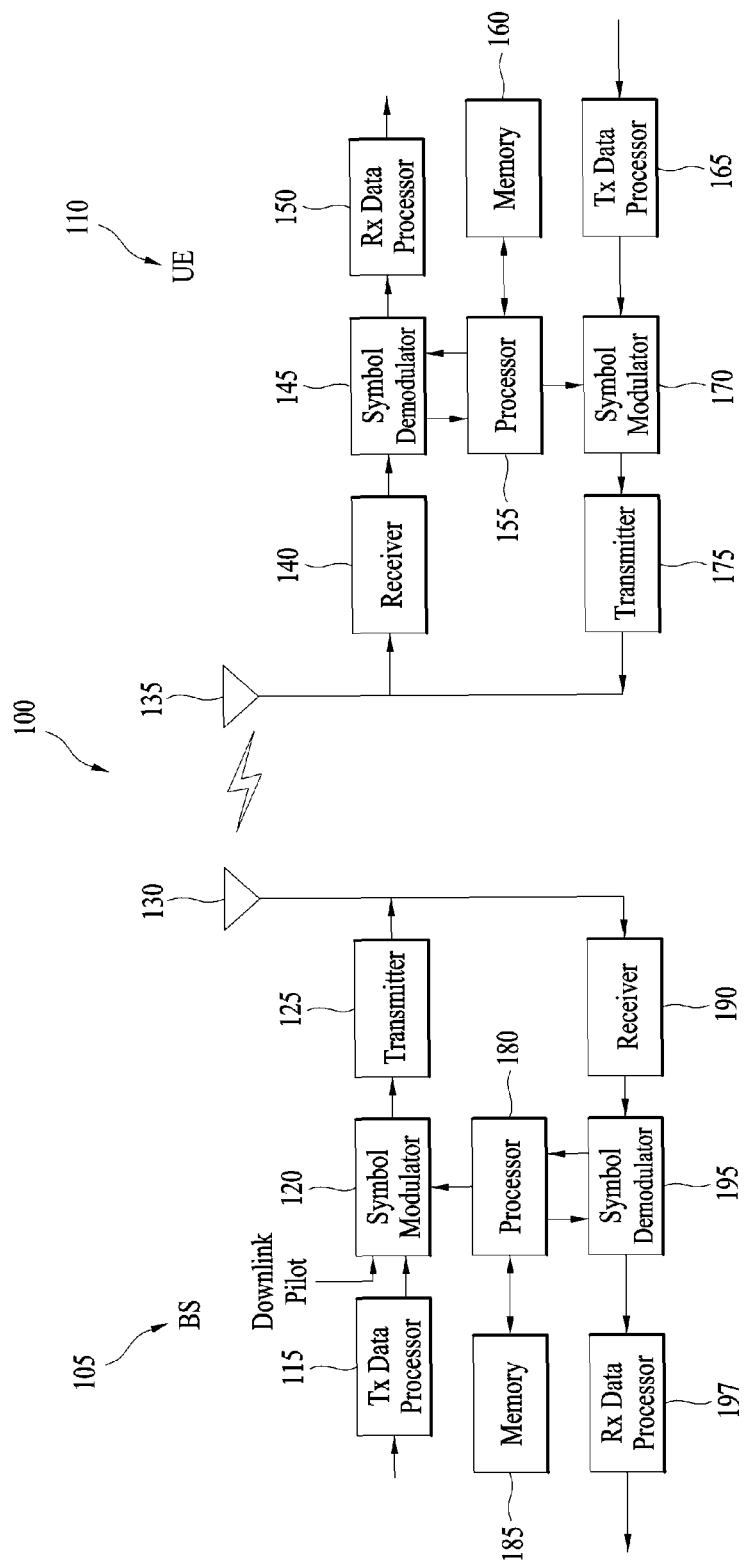
FIG. 2 is a block diagram showing the configuration of a base station 105 and a UE 110 in a wireless communication system 100.

FIG. 2 is a block diagram for configurations of a base station 105 and a user equipment 110 in a wireless communication system 100.

Although one base station 105 and one user equipment 110 (D2D user equipment included) are shown in the drawing to schematically represent a wireless communication system 100, the wireless communication system 100 may include at least one base station and/or at least one user equipment.

Referring to FIG. 2, a base station 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the base station/user equipment 105/110 includes one antenna 130/135 in the drawing, each of the base station 105 and the user equipment 110 includes a plurality of antennas. Therefore, each of the base station 105 and the user equipment 110 of the present invention supports an MIMO (multiple input multiple output) system. And, the base station 105 according to the present invention may support both SU-MIMO (single user-MIMO) and MU-MIMO (multi user-MIMO) systems.

In downlink, the transmitted data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the user equipment via the antenna 130.

In the configuration of the user equipment 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmitted data processor 115 in the base station 105, respectively.

In the user equipment 110 in uplink, the transmitted data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the base station 105 via the antenna 135.

In the base station 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present invention as ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 155/180 or saved in the memory 160/185 to be driven by the processor 155/180.

Layers of a radio protocol between a user equipment/base station and a wireless communication system (network) may be classified into 1st layer L1, 2nd layer L2 and 3rd layer L3 based on 3 lower layers of OSI (open system interconnection) model well known to communication systems. A physical layer belongs to the 1st layer and provides an information transfer service via a physical channel. RRC (radio resource control) layer belongs to the 3rd layer and provides control radio resourced between UE and network. A user equipment and a base station may be able to exchange RRC messages with each other through a wireless communication network and RRC layers.

In the present specification, although the processor 155/180 of the user equipment/base station performs an operation of processing signals and data except a function for the user equipment/base station 110/105 to receive or transmit a signal, for clarity, the processors 155 and 180 will not be mentioned in the following description specifically. In the following description, the processor 155/180 can be regarded as performing a series of operations such as a data processing and the like except a function of receiving or transmitting a signal without being specially mentioned.

Figure 3:
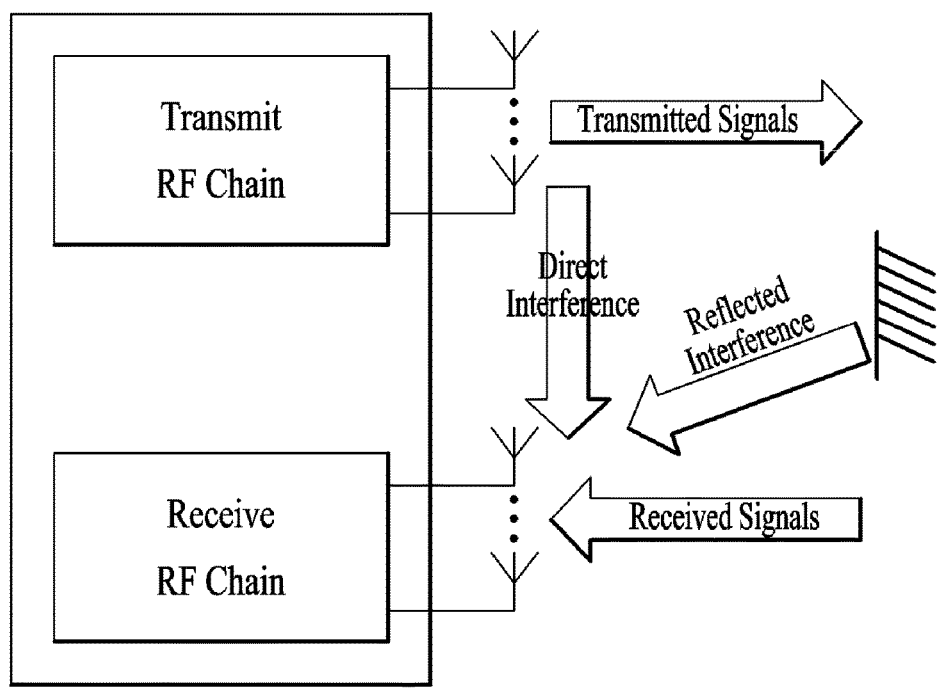
FIG. 3 is a diagram showing the concept of self-interference (SI) and a transmission/reception links in an FDR communication environment.

FIG. 3 is a conceptual diagram of self-interference (SI) and Tx/Rx links in an FDR communication environment.

Referring to FIG. 3, the SI can be divided into direct interference, which is caused when a signal transmitted from a transmit (Tx) antenna is received at an Rx antenna of the same device without path attenuation, and reflected interference, which is caused when a signal transmitted from a Tx antenna is reflected on a surrounding object and then received at an Rx antenna of the same device. In addition, the strength of the SI is extremely higher than that of a desired signal due to a physical distance difference. Thus, the SI should be cancelled for efficie In order to efficiently implement an FDR system, self-IC requirements with respect to maximum transmit power of devices may be determined as illustrated in Table 1 below.

TABLE 1

Self-IC requirements when the FDR is applied to a mobile communication system (BW = 20 MHz)

| Node Type | Max. Tx Power ($P_A$) | Thermal Noise. (BW = 20 MHz) | Receiver NF | Receiver Thermal Noise Level | Self-IC Target ($P_A$ − TN − NF) |
|---|---|---|---|---|---|
| Macro eNB | 46 dBm | −101 dBm | 5 dB (for eNB) | −96 dBm | 142 dB |
| Pico eNB | 30 dBm | | | | 126 dB |
| Femto eNB, WLAN AP | 23 dBm | | | | 119 dB |
| UE | 23 dBm | | 9 dB (for UE) | −92 dBm | 115 dB |

Referring to Table 1, it may be noted that to effectively operate the FDR system in a 20-MHz BW, a UE needs 119-dBm Self-IC performance. A thermal noise value may be changed to $N_{0,BW} = -174$ dBm$+10 \times \log_{10}$(BW) according to the BW of a mobile communication system. In Table 3, the thermal noise value is calculated on the assumption of a 20-MHz BW. In relation to Table 3, for Receiver Noise Figure (NF), a worst case is considered referring to the 3GPP specification requirements. Receiver Thermal Noise Level is determined to be the sum of a thermal noise value and a receiver NF in a specific BW.

Types of Self-IC Schemes and Methods for Applying the Self-IC Schemes

Figure 4:
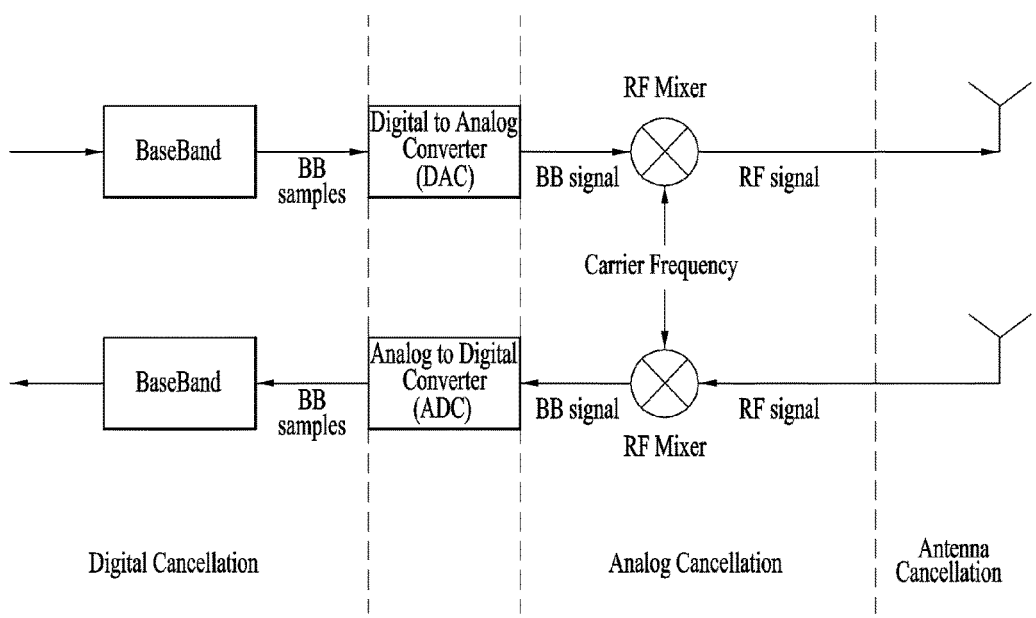
FIG. 4 is a view illustrating positions at which three Self-IC schemes are applied, in a Radio Frequency (RF) Tx and Rx end (or an RF front end) of a device.

FIG. 4 is a view illustrating positions at which three Self-IC schemes are applied, in a Radio Frequency (RF) Tx and Rx end (or an RF front end) of a device. Now, a brief description will be given of the three Self-IC schemes.

Antenna Self-IC: Antenna Self-IC is a Self-IC scheme that should be performed first of all Self-IC schemes. SI is cancelled at an antenna end. Most simply, transfer of an SI signal may be blocked physically by placing a signal-blocking object between a Tx antenna and an Rx antenna, the distance between antennas may be controlled artificially, using multiple antennas, or a part of an SI signal may be canceled through phase inversion of a specific Tx signal. Further, a part of an SI signal may be cancelled by means of multiple polarized antennas or directional antennas.

Analog Self-IC: Interference is canceled at an analog end before an Rx signal passes through an Analog-to-Digital Convertor (ADC). An SI signal is canceled using a duplicated analog signal. This operation may be performed in an RF region or an Intermediate Frequency (IF) region. SI signal cancellation may be performed in the following specific method. A duplicate of an actually received SI signal is generated by delaying an analog Tx signal and controlling the amplitude and phase of the delayed Tx signal, and subtracted from a signal received at an Rx antenna. However, due to the analog signal-based processing, the resulting implementation complexity and circuit characteristics may cause additional distortion, thereby changing interference cancellation performance significantly.

Digital Self-IC: Interference is canceled after an Rx signal passes through an ADC. Digital Self-IC covers all IC techniques performed in a baseband region. Most simply, a duplicate of an SI signal is generated using a digital Tx signal and subtracted from an Rx digital signal. Or techniques of performing precoding/postcoding in a baseband using multiple antennas so that a Tx signal of a UE or an eNB may not be received at an Rx antenna may be classified into digital Self-IC. However, since digital Self-IC is viable only when a digital modulated signal is quantized to a level enough to recover information of a desired signal, there is a need for the prerequisite that the difference between the signal powers of a designed signal and an interference signal remaining after interference cancellation in one of the above-described techniques should fall into an ADC range, to perform digital Self-IC.

Figure 5:
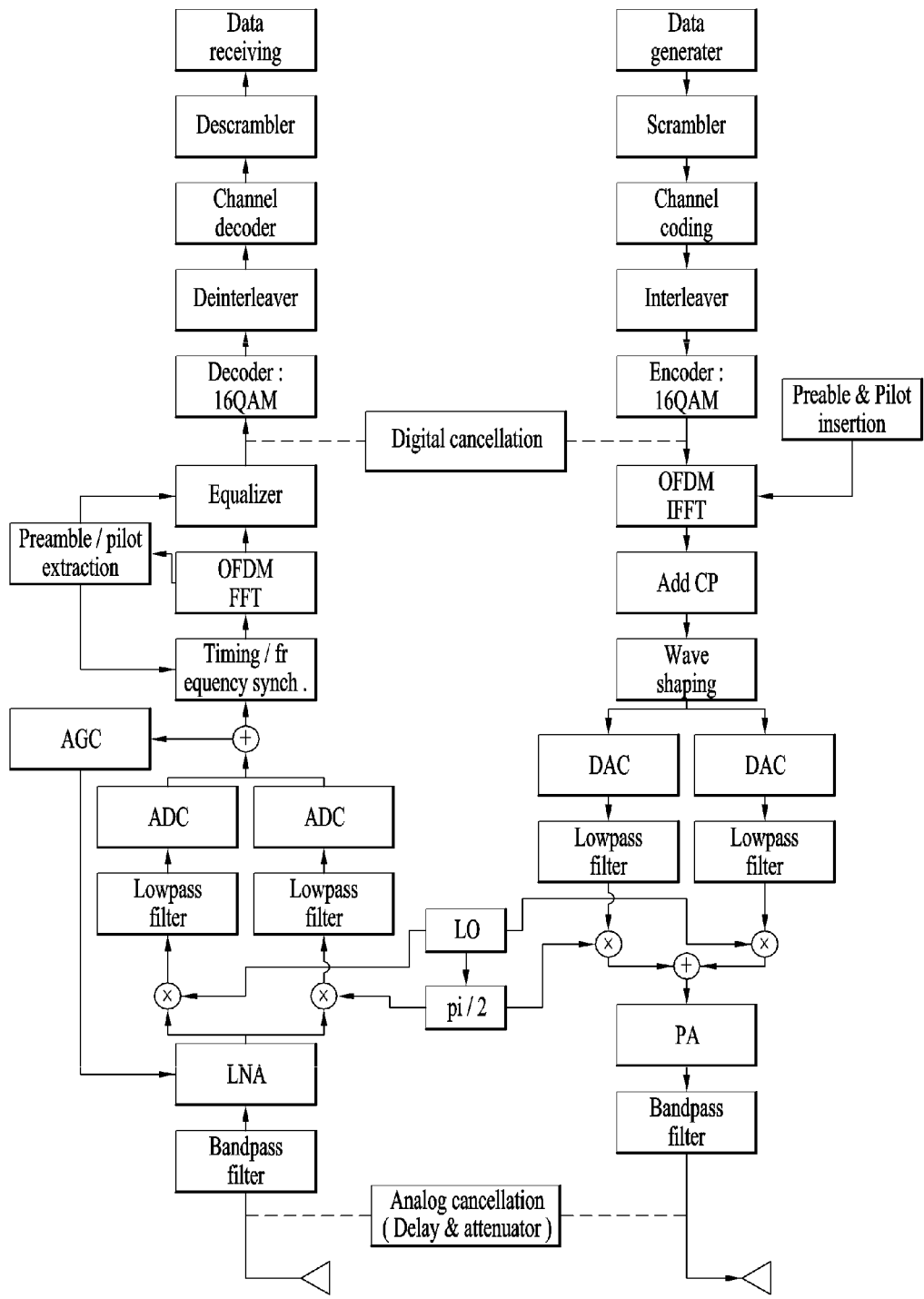
FIG. 5 is a block diagram of a self-IC device in a proposed communication apparatus in an OFDM communication environment based on FIG. 4.

FIG. 5 is a block diagram of a Self-IC device in a proposed communication apparatus in an OFDM communication environment based on FIG. 4.

While FIG. 5 shows that digital Self-IC is performed using digital SI information before Digital to Analog Conversion (DAC) and after ADC, it may be performed using a digital SI signal after Inverse Fast Fourier Transform (IFFT) and before Fast Fourier Transform (FFT). Further, although FIG. 5 is a conceptual view of Self-IC though separation of a Tx antenna from an Rx antenna, if antenna Self-IC is performed using a single antenna, the antenna may be configured in a different manner from in FIG. 5. A functional block may be added to or removed from an RF Tx end and an RF Rx end shown in FIG. 5 according to a purpose.

Signal Modeling in the FDR System

Since an FDR system uses the same frequency between a transmitted signal and a received signal, non-linear components in an RF signal have significant influence. In particular, a transmitted signal is distorted by non-linear properties of active elements such as a power amplifier (PA) and a low noise amplifier (LNA), and, due to such distortion, the transmitted signal may be modeled as generation of a component corresponding to a high order. A component corresponding to an even order has influence on the vicinity of DC and thus may be efficiently cancelled using an existing AC coupling or filtering scheme. However, a component corresponding to an odd order is generated in the vicinity of a center frequency and thus cannot be easily cancelled unlike the even order, thereby having significant influence on reception. In consideration of the non-linear properties of the odd order, a received signal subjected to ADC in an FDR system may be expressed using the Parallel Hammerstein (PH) model as shown in Equation 1 below.

$$y(n) = h_D(n) * x_D(n) + \sum_{\substack{k=1,\ldots,K \\ k=odd}} h_{SI,k}(n) * |x_{SI}(n)|^{k-1} x_{SI}(n) + z(n),$$ [Equation 1]

where, $x_D(n)$ denotes data to be received by an RF end of a device, $h_D(n)$ denotes a desired channel experienced by data to be received, $x_{SI}(n)$ denotes data transmitted by the RF end of the device, $h_{SI,k}(n)$ denotes a self-interference channel experienced by data transmitted by the RF end of the device, which is a linear component if k is 1 and is a nonlinear component if k is an odd number of 3 or more and z(n) denotes Additive White Gaussian Noise (AWGN).

When a base station (eNB) or a UE operates in a full-duplex scheme or mode for downlink transmission and uplink transmission, if transmit power is changed according to change in channel environment and peripheral environment, problems may occur in downlink data transmission and reception between the UE and the base station due to change in self-IC performance in the UE. For example, if a distance between the UE and the base station is increased due to movement of the UE, the UE may perform an open-loop power control method or a closed-loop power control method to increase transmit power. At this time, the amount of power of self-interference is increased due to increased transmit power of the UE and thus self-interference performance may be changed even when an existing self-IC scheme or a self-IC scheme suitable for the increased transmit power is applied, thereby increasing a residual self-interference signal. However, in a legacy LTE system, the base station cannot check the state and information of the UE (e.g., transmit power of the UE, increase in self-interference signal strength at the RF end due to increase in transmit power of the UE, decrease in self-interference signal strength at the RF end due to decrease in transmit power of the UE). Thus, the residual self-interference signal of the UE is not considered upon downlink transmission using a modulation and coding scheme (MCS) set by the base station, thereby causing link failure. Accordingly, for stable FDR operation, signaling is required for the base station to check the state of the UE in consideration of performance of the instantaneous self-IC scheme of the UE when the power of the UE increases or decreases. The UE needs to periodically or aperiodically signal information on change in a residual self-interference signal to the base station. If the base station configures the UE to report information on the residual self-interference signal through an RRC signal in the FDR mode, information on the value of the instantaneous residual self-interference signal of the UE may be transmitted.

The UE may signal information on the changed residual self-interference signal to the base station, thereby implementing a stable FDR mode. Here, the information on the changed residual self-interference signal transmitted from the UE to the base station will be described in detail in the following embodiments.

Embodiment 1: UE Transmits Information on Residual Self-Interference Signal to Base Station If self-IC performance of the UE is changed due to increase or decrease in uplink transmit power of the UE (e.g., open-loop power control or closed-loop power control), the residual self-interference signal is instantaneously changed. Accordingly, the UE may signal information on the changed residual self-interference signal (e.g., the strength or value of the changed residual self-interference signal) to the base station through a physical layer signal or a higher layer signal. Here, the value of the residual self-interference signal refers to the strength of a self-interference signal remaining even after performing a self-IC scheme such as antenna self-IC, analog self-IC or digital self-IC at an RF end. The UE may transmit the value of the residual self-interference signal to the base station through a physical layer signal, e.g., a Physical Uplink Control CHanel (PUCCH) or Physical Uplink Shared CHannel (PUSCH). Alternatively, the UE may transmit the value of the residual self-interference signal to the base station through a higher layer signal, e.g., a Radio Resource Control (RRC) signal.

In Embodiment 1, when the value of the residual self-interference signal is changed to a predetermined threshold or more, the UE may transmit the information on the changed residual self-interference signal to the base station.

The base station determines an MCS level in consideration of instantaneous residual self-interference information received from the UE through signaling upon downlink scheduling, thereby further improving downlink (DL) performance. In order to reduce overhead, a table of residual self-IC values may be transmitted or a difference therebetween may be transmitted.

TABLE 2

| MCS level | SI value |
|---|---|
| MCS level 0 | |
| MCS level 1 | |
| MCS level 2 | |
| ... | |
| MCS level n | |

The base station may receive information on the instantaneous self-interference signal from the UE, determine an MCS level corresponding to the received residual self-interference signal value as shown in Table 2 above and transmit information on the determined MCS level to the UE. Thereafter, the base station may apply the determined MCS level upon subsequent downlink transmission to the UE.

Meanwhile, if the table shown in Table 2 above is pre-shared between the UE and the base station, the UE may calculate the value of the residual self-interference signal and transmit the calculated strength of the residual self-interference signal to the base station. Then, the base station may not signal the MCS level to the UE because the MCS level corresponding to the calculated strength of the residual self-interference signal is checked through Table 2 above.

Embodiment 2: UE Transmits Margin Value of MCS Level to Base Station

In consideration of change in self-IC performance of the UE due to increase or decrease in uplink transmit power of the UE, the UE may signal the margin value of the MCS level to the base station through a physical layer signal or a higher layer signal, in addition to channel quality information (CQI), a precoding matrix indicator (PMI) and a rank indicator (RI).

(1) Case Where Uplink Transmit Power of UE is Decreased

When the uplink transmit power of the UE is decreased, the residual self-interference signal at the RF end is decreased and a margin value of an MCS level having a positive value is signaled in consideration of the decreased residual self-interference signal such that the base station transmits a higher MCS level, thereby increasing downlink throughput. To this end, the UE may calculate the value of the current decreased residual self-interference signal according to decrease in uplink transmit power and then calculate the margin value of the MCS level. Here, the margin value of the MCS level may indicate a difference between an MCS level corresponding to the value of the current residual self-interference signal and the MCS level previously used by the base station upon downlink transmission, as shown in Table 2. The margin value of the MCS level calculated by the UE may be signaled to the base station.

The base station may determine an MCS level higher than a previous MCS level as an MCS level for the UE based on the margin value of the MCS level received from the UE and apply the determined MCS level upon downlink to the UE.

(2) Case Where Uplink Transmit Power of UE is Increased

When the uplink transmit power of the UE is increased, the residual self-interference signal at the RF end is increased. The UE may signal a margin value of the MCS level having a negative value in consideration of the increased residual self-interference signal such that the base station transmits a lower MCS level, thereby increasing downlink transmission reliability. To this end, the UE may calculate the value of the increased residual self-interference signal according to increase in uplink transmit power and then calculate the margin value of the MCS level. Here, the margin value of the MCS level having the negative value may indicate a difference between an MCS level corresponding to the value of the current residual self-interference signal and the MCS level previously used by the base station upon downlink transmission, as shown in Table 2. The margin value of the MCS level calculated by the UE may be signaled to the base station. The base station may determine an MCS level lower than a previous MCS level as an MCS level for the UE based on the margin value of the MCS level received from the UE and apply the determined MCS level upon downlink to the UE.

For example, in a 3GPP LTE/LTE-A system, CQI is defined as shown in Table 3 (MCS feedback table CQI). The UE feeds an index corresponding to the CQI thereof back to the base station using 4-bit information and the base station determines an actual MCS level to be assigned to each UE through the fed-back index corresponding to the CQI as shown in Table 4 (example of CQI index and MCS mapping). The MCS actually applied to the DCI of the UE is mapped to a total of 5 bits (indices 0 to 31).

TABLE 3

| Index | Modulation order | Code Rate × 1024 | β | SINR threshold (dB) |
| --- | --- | --- | --- | --- |
| 0 | | No transmission | | |
| 1 | QPSK | 78 | 1.00 | −9.478 |
| 2 | QPSK | 120 | 1.40 | −6.658 |
| 3 | QPSK | 193 | 1.40 | −4.098 |
| 4 | QPSK | 308 | 1.48 | −1.798 |
| 5 | QPSK | 449 | 1.50 | 0.399 |
| 6 | QPSK | 602 | 1.62 | 2.424 |
| 7 | 16QAM | 378 | 3.10 | 4.489 |
| 8 | 16QAM | 490 | 4.32 | 6.367 |
| 9 | 16QAM | 616 | 5.37 | 8.456 |
| 10 | 64QAM | 466 | 7.71 | 10.266 |
| 11 | 64QAM | 567 | 15.5 | 12.218 |
| 12 | 64QAM | 666 | 19.6 | 14.122 |
| 13 | 64QAM | 772 | 24.7 | 15.849 |
| 14 | 64QAM | 873 | 27.6 | 17.786 |
| 15 | 64QAM | 948 | 28.0 | 19.809 |

TABLE 4

| CQI | Modulation | Bits/Symbol | REs/PRB | N_RB | MCS | TBS | Code Rate |
| --- | --- | --- | --- | --- | --- | --- | --- |
| 1 | QPSK | 2 | 138 | 20 | 0 | 536 | 0.101449 |
| 2 | QPSK | 2 | 138 | 20 | 0 | 536 | 0.101449 |
| 3 | QPSK | 2 | 138 | 20 | 2 | 872 | 0.162319 |
| 4 | QPSK | 2 | 138 | 20 | 5 | 1736 | 0.318841 |
| 5 | QPSK | 2 | 138 | 20 | 7 | 2417 | 0.442210 |
| 6 | QPSK | 2 | 138 | 20 | 9 | 3112 | 0.568116 |
| 7 | 16QAM | 4 | 138 | 20 | 12 | 4008 | 0.365217 |
| 8 | 16QAM | 4 | 138 | 20 | 14 | 5160 | 0.469565 |
| 9 | 16QAM | 4 | 138 | 20 | 16 | 6200 | 0.563768 |
| 10 | 64QAM | 6 | 138 | 20 | 20 | 7992 | 0.484058 |
| 11 | 64QAM | 6 | 138 | 20 | 23 | 9912 | 0.600000 |
| 12 | 64QAM | 6 | 138 | 20 | 25 | 11448 | 0.692754 |
| 13 | 64QAM | 6 | 138 | 20 | 27 | 12576 | 0.760870 |
| 14 | 64QAM | 6 | 138 | 20 | 28 | 14688 | 0.888406 |
| 15 | 64QAM | 6 | 138 | 20 | 28 | 14688 | 0.888406 |

In general, since a detailed method of deriving CQI is not described in the standard, the UE may calculate CQI through various methods. A method of deriving CQI using an SINR is most well known. In deriving of the SINR, RSRP, RSRQ and RSSI as existing measurement values may be used. Hereinafter, the RSRP, the RSRQ and the RSSI will be described.

RSSI—Received Signal Strength Index
Carrier RSSI: A carrier RSSI measures average receive power of OFDM symbols (that is, OFDM symbol indices 0 and 4 in one slot) including a reference signal at antenna port 0.
RSSI measures N resource blocks.
The Carrier RSSI includes the strengths of signals of a serving cell and a non-serving cell at the same channel (frequency), neighboring channel interference, thermal noise, etc.
RSRP—Reference Signal Received Power
The RSRP measures receive power like the RSSI.
The RSRP is receive power of an LTE reference signal measured in broadband/narrowband.
In order to measure the RSRP/RSRQ, the SINR of an S-Synch channel is −20 dB or more.
RSRQ—Reference Signal Received Quality
The RSRQ considers the RSSI and the number of used resource blocks.
RSRQ=(N*RSRP)/RSSI
The RSRQ indicates quality of the reference signal received through C/I measurement.
The RSRQ provides additional information if stable handover or cell reselection cannot be sufficiently performed using only the RSRP.
The RSRP is average receive power of resource elements containing a cell-specific reference signal (RS) in entire bandwidth. Accordingly, an RSRP performs measurement with respect to only symbols including an RS. The UE performs measurement with respect to a plurality of RS resource elements and obtains an average thereof. The RSRP is average receive power of one RS resource element. A RSRP range reported by the UE is −44 to −140 dBm. Examples of the method of deriving the SINR using the RSRQ include, but are not limited to, the following two methods.

$$\text{SINR} = \text{RSRQ} + 10\log 10(\rho_B \cdot N_{SC}) \quad \text{[Equation 2]}$$

where, $N_{SC}$ denotes the number of subcarriers per RB and the value thereof is 12. Next, $\rho_B$ is a ratio of RS EPRE to PDSCH EPRE defined in section 5.2 of TS 36.213.

Next, Equations 3 and 4 below may be used.

$$\text{RSSI} = \text{InterferencePower} + \text{Noise} + \text{RSRP} \cdot x \cdot N \quad \text{[Equation 3]}$$

$$\text{RSRQ} = N \cdot \text{RSRP} / \text{RSSI} \quad \text{[Equation 4]}$$

where, x denotes a used RE per RB. In full load, x=12. N means the number of RBs, and becomes a value corresponding to bandwidth. Finally, a final relation between the SINR and the RSRQ becomes Equation 5.

$$\text{SINR} = \frac{S}{I + \text{Noise}} = \frac{\text{RSRP} \cdot 12 \cdot N}{\text{RSSI} - \text{RSRP} \cdot x \cdot N} = \frac{\text{RSRP} \cdot 12 \cdot N}{N \cdot \text{RSRP} / \text{RSRQ} - \text{RSRP} \cdot x \cdot N} = \frac{12}{1/\text{RSRQ} - x} \quad \text{[Equation 5]}$$

As a result, for CQI measurement, it can be seen that any one of the RSRP, the RSRQ and the RSSI may be used and the RS is directly used.

For example, the UE may measure the SINR using the above-described method and determine and feed an MCS level as in Tables 2 and 3 in consideration of a residual self-interference signal back to the base station. In addition, the base station may determine CQI based on the fed-back MCS level as shown in Table 4. Tables 3 and 4 are examples and a mapping value may be changed in consideration of the residual self-interference signal.

Embodiment 3: Value of Transmit Power of UE is Transmitted to Base Station

In consideration of change in self-IC performance of the UE due to increase or decrease in uplink transmit power of the UE (e.g., open-loop power control or closed-loop power control), the value of the transmit power of the UE may be signaled to the base station through a physical layer signal (e.g., PUCCH, PUSCH) or a higher layer signal (e.g., RRC signal).

When the UE transmits an absolute value of the transmit power of the UE to the base station periodically or aperiodically according to a request of the base station and the UE (on-demand), the base station may predict or estimate the residual self-interference signal and residual self-IC state of the UE based on the received absolute value of the transmit power of the UE.

After receiving the absolute value of the transmit power, when the UE operates using the closed-loop power control method, the UE does not need to perform additional signaling for transmission of the absolute value of the transmit power to the base station, thereby reducing signaling overhead of the UE.

Meanwhile, even after receiving the absolute value of the transmit power from the UE, when the UE operates using the open-loop power control method, the UE may signal the absolute value of the transmit power to the base station through a physical layer signal (e.g., PUCCH or PUSCH) or a higher layer signal (e.g., RRC signal) according to a request of the UE.

In addition, for stable FDR operation, the absolute value of the transmit power of the UE may be transmitted to the base station periodically or aperiodically according to a request of the base station through a physical layer signal (e.g., PUCCH or PUSCH) or a higher layer signal (e.g., RRC signal).

Embodiment 4: Case Where UE Transmits Statistical Information to Base Station in Addition to Instantaneous Value of Residual Self-Interference Signal of UE Not only the instantaneous value but also the statistical information (e.g., the statistical information of a specific order of the residual self-interference signal (e.g., second-order statistics)) of self-IC performance and residual self-interference signal information of the UE may be transmitted to the base station through a physical layer signal or a higher layer signal. The base station may determine the MCS level of downlink based on the statistical information of the residual self-interference signal received from the UE.

Embodiments 1 to 4 described above may be selectively implemented only when the absolute value of the transmit power is a predetermined threshold. For example, in the case of a UE for performing transmission at predetermined transmit power or less (e.g., 10 dBm or less), even when transmit power is increased or decreased, a stable self-IC scheme can be performed when the transmit power is equal to or less than the predetermined threshold and thus the value of the residual self-interference signal, the margin value of the MCS level or the absolute value of the transmit power of the UE may not be signaled to the base station.

In addition, the methods of Embodiments 1 to 4 may be selectively performed only when there is data to be transmitted by the UE on uplink. For example, since the base station may predict a duration for the FDR operation of the UE through a buffer status report (BSR) signal, the UE may signal the BSR to the base station through a physical layer signal or a higher layer signal at a desired time.

Meanwhile, the above-proposed embodiments are limited to the FDR system and are applicable to a cellular system. For example, if not only interference signals due to same-band downlink and uplink signals received from neighboring cells (e.g., macro cells, micro cells, small cells, etc.) in existing cellular downlink but also inter-device interference due to uplink signals received from the other UEs of the same cell (if the base station operates using FDR and the UE operates using HD) and interference from device-to-device (D2D) UEs using the same band are generated to influence the SINR of the UE, the information transmitted by the UE in Embodiments 1 to 4 may be selectively transmitted to the base station through a physical layer signal or a higher layer signal.

The above-described embodiments may be independently implemented or some thereof may be combined (or merged). A rule may be defined to signal information indicating whether the above-described embodiments are applied (e.g., information on the rules of the methods of the above-described embodiments, information indicating which embodiment is applied, etc.) through a signal (e.g., a physical layer signal or a higher layer signal) predefined by the base station for the UE.

As described above, according to the embodiment of the present invention, in an FDR transmission and reception system, by considering a residual self-interference signal generated by change in self-IC performance according to change in transmit power of the UE and the base station, it is possible to stably implement FDR.

The above-described embodiments are combinations of elements and features of the present invention in a predetermined manner Each of the elements or features may be considered selective unless mentioned otherwise. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. In the appended claims, claims that are not explicitly dependent upon each other may of course be combined to provide an embodiment or new claims can be added through amendment after the application is filed.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

A method of stably implementing a full-duplex radio (FDR) mode in a wireless communication system supporting the FDR mode and a device therefor according to the present invention are applicable to various wireless communication systems such as 3GPP LTE/LTE-A systems.

What is claimed is:

1. A method for stably operating a full-duplex radio (FDR) mode by a user equipment (UE) in a wireless communication system supporting the FDR mode, the method comprising:
when a residual self-interference signal is changed that the residual self-interference signal is equal to or greater than a predetermined threshold in the UE, transmitting information on a changed residual self-interference signal to a base station; and
receiving a downlink signal from the base station based on a modulation and coding scheme (MCS) level corresponding to the information on the changed residual self-interference signal,
wherein the information on the changed residual self-interference signal includes a margin value of the MCS level.

2. The method according to claim 1, wherein the information on the changed residual self-interference signal further includes a value of a strength of the changed residual self-interference signal.

3. The method according to claim 1, further comprising:
calculating the margin value of the MCS level based on a value of a strength of the changed residual self-interference signal.

4. The method according to claim 1, wherein the margin value of the MCS level is a negative value if a strength of the changed residual self-interference signal is increased and is a positive value if the strength of the changed residual self-interference signal is decreased.

5. The method according to claim 1, wherein the information on the changed residual self-interference signal is transmitted only when an absolute value of transmit power of the UE is equal to or greater than a predetermined threshold.

6. The method according to claim 1, further comprising:
receiving information on the MCS level corresponding to the information on the changed residual self-interference signal from the base station.

7. The method according to claim 1, wherein the margin value of the MCS level corresponds to a difference from a previously used MCS level in a predetermined MCS level table.

8. The method according to claim 1, wherein the residual self-interference signal is defined as a remaining self-interference signal after performing antenna self-interference cancellation, analog self-interference cancellation and digital self-interference cancellation.

9. A user equipment (UE) for stably operating a full-duplex radio (FDR) mode in a wireless communication system supporting the FDR mode, the UE comprising:
a transmitter configured to transmit information on a changed residual self-interference signal to a base station when a residual self-interference signal is changed that the residual self-interference signal is equal to or greater than a predetermined threshold in the UE; and
a receiver configured to receive a downlink signal from the base station based on a modulation and coding scheme (MCS) level corresponding to the information on the changed residual self-interference signal,
wherein the information on the changed residual self-interference signal includes a margin value of the MCS level.

10. The UE according to claim 9, wherein the information on the changed residual self-interference signal further includes a value of a strength of the changed residual self-interference signal.

11. The UE according to claim 10, further comprising a processor configured to calculate the margin value of the MCS level based on the value of the strength of the changed residual self-interference signal.

12. The UE according to claim 9, wherein the transmitter transmits the information on the changed residual self-interference signal only when an absolute value of transmit power of the UE is equal to or greater than a predetermined threshold.

13. The UE according to claim 9, wherein the receiver further receives information on the MCS level corresponding to the information on the changed residual self-interference signal from the base station.

14. The UE according to claim 9, wherein the margin value of the MCS level corresponds to a difference from a previously used MCS level in a predetermined MCS level table.

15. The UE according to claim 9, wherein the residual self-interference signal is defined as a remaining self-interference signal after performing antenna self-interference cancellation, analog self-interference cancellation and digital self-interference cancellation.

* * * * *